United States Patent [19]

Meisel, Jr. et al.

[11] 4,257,653
[45] Mar. 24, 1981

[54] TRACK ASSEMBLY FOR TRACK-TYPE VEHICLES WITH DUAL LINK ASSEMBLIES

[75] Inventors: Thomas C. Meisel, Jr., Peoria; Robert N. Stedman, Chillicothe, both of Ill.

[73] Assignee: Caterpillar Tractor Co., Peoria, Ill.

[21] Appl. No.: 69,021

[22] Filed: Aug. 23, 1979

[51] Int. Cl.$^3$ .................. B62D 55/12; B62D 55/20
[52] U.S. Cl. ........................... 305/28; 305/54; 305/56; 305/57; 29/401.1; 29/402.03
[58] Field of Search ............... 305/15, 21, 23, 24–25, 305/28, 27, 39, 45, 54, 56–57; 29/401.1, 402.3

[56] References Cited

U.S. PATENT DOCUMENTS

| | | | |
|---|---|---|---|
| 1,140,969 | 5/1915 | Eastman | 305/28 |
| 1,254,819 | 1/1918 | Leyner . | |
| 1,258,605 | 3/1918 | Norelius et al. . | |
| 1,318,188 | 10/1919 | Tritton | 305/28 |
| 1,442,570 | 1/1923 | Holt . | |
| 3,601,212 | 8/1971 | Peterson et al. | 180/9.44 |
| 3,913,986 | 10/1975 | Schaffner | 305/57 |
| 4,050,141 | 9/1977 | Van Landingham et al. | 29/402.03 X |

Primary Examiner—Charles A. Marmor
Attorney, Agent, or Firm—Phillips, Moore, Weissenberger, Lempio & Majestic

[57] ABSTRACT

A track assembly (11) for a track-type vehicle (10) includes a pair of link assemblies (17,18) having inboard links (20,24) thereof solely engageable with the idler (13) and track rollers (14) of the vehicle (10). When the vehicle (10) traverses wet or swampy ground, wherein it proves desirable to utilize relatively wide track shoes (16), torsional loads imposed on the shoes can cause premature wear or damage to the shoes (16). The track assembly (11) exhibits a high resistance to such torsional loads imposed thereon and adapts itself for use in lieu of a standard track assembly on a conventional track-type vehicle. A method for prolonging the service life of the track assembly comprises interchanging the two link assemblies (17,18).

13 Claims, 5 Drawing Figures

TRACK ASSEMBLY FOR TRACK-TYPE VEHICLES WITH DUAL LINK ASSEMBLIES

DESCRIPTION

1. Technical Field

This invention relates to a track assembly for track-type vehicles comprising a pair of link assemblies secured to track shoes thereof.

2. Background Art

Conventional track-type vehicles, such as tractors, are mounted on a pair of endless track assemblies each including a plurality of pivotally interconnected track shoes. The track shoes are pivotally interconnected together by a link assembly, disposed intermediate the width of the shoes, including pairs of laterally spaced links pivotally interconnected by pin and bushing assemblies. The drive sprocket of the vehicle engages the pin and bushing assemblies to drive the track assembly with the track assembly being guided by track rollers and an idler maintained in bearing contact with rail surfaces defined on upper portions of each pair of links.

The advent of relatively wide low ground pressure (LGP) track shoes has given rise to the problem of imposing severe torsional loads on the track assembly when it traverses uneven terrain and engages stationary objects, such as rocks, stumps, and the like. The torsional loads imposed on the track assembly deflect the track shoes whereby they are subjected to potential damage, along with the bolts which secure the track shoes to the link assembly. Furthermore, torsional loads are transmitted to the pin and bushing assemblies of the link assembly which tends to wallow-out the bushing bores thereof and to cause pin drift.

Should the forces imposed on the link assembly become unduly severe, the links thereof may also be subjected to damage, such as cracking. Similar problems also arise with respect to pin and bushing assemblies of the sealed and lubricated type wherein extraneous forces imposed thereon subject the assemblies to loss of lubricant.

Although the above problems are not readily apparent with respect to conventional track assemblies, having track shoes with relatively small widths, the problems become pronounced when a standard track shoe is replaced by a wide low ground pressure (LGP) track shoe. The latter type of track shoe finds particular application when the vehicle is adapted to work over swampy or marshy ground conditions, such as during a logging operation. The flotation, traction, and related operating characteristics of the vehicle are greatly aided by the use of the wider track shoes. However, and as above suggested, the wider track shoe gives rise to the above-mentioned torsional loading problem since the cantilevered ends thereof, outboard of the link assembly, create substantial moments when forces are applied to the ends of the track shoes.

A conventional track assembly is also driven by a single drive sprocket which provides substantial loading of the pin and bushing assemblies thus subjecting the sprocket and bushing assemblies to premature wear and possible failure. Furthermore, the rail surfaces of the links are prone to wear and must be periodically repaired or replaced.

Although the above problems of transmitting high torsional loads to the track shoes and link assembly, and subjecting the drive sprocket, pin and bushing assemblies, and rail surfaces of the links to premature failure, may be alleviated by "beefing-up" the component parts of the track assembly, such approach has many obvious economical and operating disadvantages. For example, substantial weight must be added to the track assembly to provide the desired reinforcement and torsional loading and wear resistant capabilities.

Another approach to the torsional loading problem is one of providing the track assembly with two pairs of laterally spaced link assemblies. This type of track assembly is disclosed in U.S. Pat. No. 1,442,570, issued to Pliny E. Holt on Jan. 16, 1923 and in U.S. Pat. No. 1,258,605, issued to Emil F. Norelius et al on Mar. 5, 1918. The track assemblies of these patents are engaged by specially designed idlers and track rollers which thus gives rise to obvious disadvantages. For example, track assemblies of this type cannot be adapted for use with present day track-type vehicles which include standard idlers and track rollers which are constructed and arranged to normally engage a standard track assembly having a single link assembly pivotally interconnecting track shoes thereof together.

DISCLOSURE OF THE INVENTION

The present invention is directed to overcoming one or more of the problems as set forth above.

In one aspect of this invention, a track-type vehicle comprises a sprocket, an idler, a plurality of track rollers, and an endless track assembly, including a plurality of track shoes and a pair of first and second laterally-spaced link assemblies secured to the track shoes. Each link assembly includes a plurality of pairs of inboard and outboard links, with at least the inboard links defining rail surface portions thereon, and pivot means for pivotally connecting each pair of inboard and outboard links together. The idler and track rollers are solely engageable with the rail surface portions defined on the inboard links.

In another aspect of this invention, the two link assemblies may be interchanged to thus replace the worn inboard links of the link assemblies with the unworn outboard links thereof.

In still another aspect of this invention, the track assembly of this invention can be substituted in lieu of a standard track assembly, employing a single link assembly, without modifying the track roller frame and associated components of the particular vehicle.

The above track assembly thus resists torsional loads imposed thereon during operation thereof and adapts the track assembly for use on a vehicle having standard idler and track roller components. Furthermore, the two link assemblies can be interchanged upon wear of the rail surface portions of the inboard links thereof to substantially increase the service life of the track assembly.

BRIEF DESCRIPTION OF THE DRAWINGS

Other objects of this invention will become apparent from the following description and accompanying drawings wherein.

BEST MODE OF CARRYING OUT THE INVENTION

Figure 1:
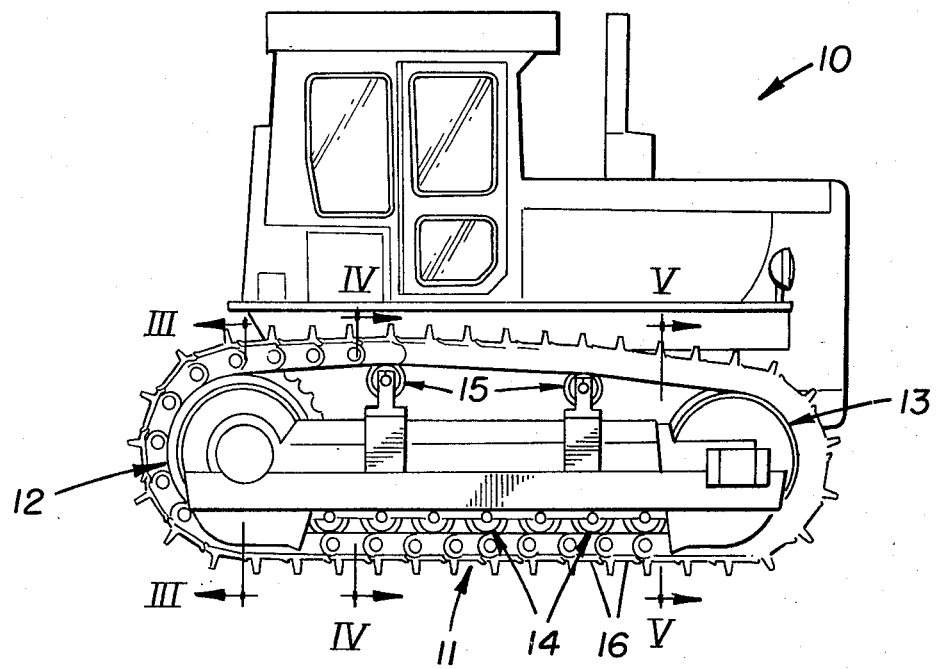
FIG. 1 is a side elevational view of a track-type tractor employing a track assembly embodiment of the present invention thereon.

FIG. 1 illustrates a track-type tractor 10 having a continuous track system including a pair of endless track assemblies 11 (one shown), mounted thereon. Although track assembly 11 is particularly adapted for use on a track-type tractor, it should be understood that the track assembly will find application to other track-type vehicles, such as excavators. Each track assembly 11 is mounted on a drive sprocket 12, an idler 13, a plurality of longitudinally spaced track rollers 14, and a pair of upper guide rollers 15.

Figure 2:
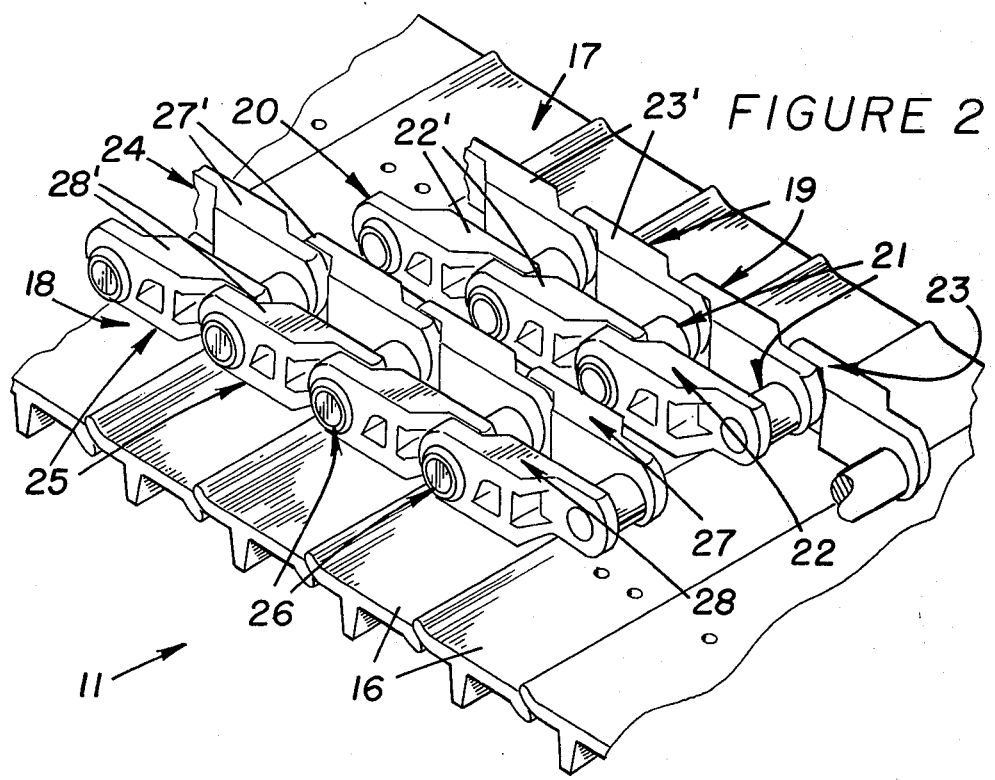
FIG. 2 is an isometric view partially illustrating the track assembly.

Referring to FIG. 2, track assembly 11 comprises a plurality of track shoes 16 which are pivotally interconnected by a pair of first and second articulated link assemblies 17 and 18, respectively. First link assembly 17, disposed laterally relative to second link assembly 18, includes laterally spaced sets of outboard links 19 and inboard links 20 with each pair of laterally spaced inboard and outboard links being pivotally connected to each next adjacent pair in a conventional manner by a standard pin and bushing assembly 21. Links 19 and 20, bolted or otherwise suitably secured to track shoes 16, define generally continuous rail surfaces 22 and 23 thereon, composed of individual rail surface portions 22' and 23'. Rail surface 22 is adapted to engage idler 13 and rollers 14 and 15 in the manner hereinafter described.

Second link assembly 18 is identical to first link assembly 17 and includes laterally spaced sets of inboard and outboard links 24 and 25, respectively, suitably secured to track shoes 16. Each pair of laterally spaced inboard and outboard links 24 and 25 are pivotally connected to a next adjacent pair of links by a pin and bushing assembly 26. Links 24 and 25 define generally continuous rail surfaces 27 and 28 thereon, composed of individual rail surface portions 27' and 28', respectively.

Figure 3:
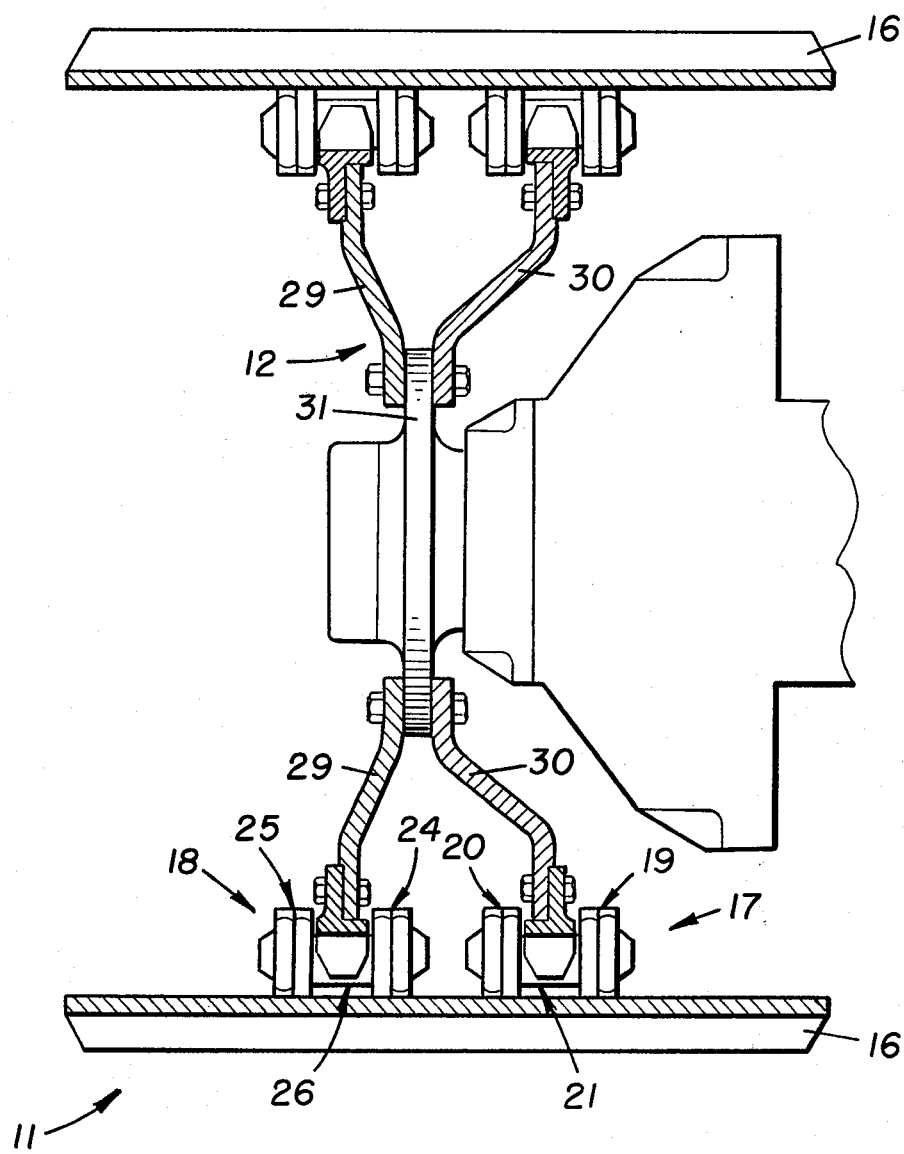
FIGS. 3–5 are enlarged sectional views, taken in the direction of arrows III—III, IV—IV, and V—V in FIG. 1, respectively.

Referring to FIG. 3, sprocket 12 preferably comprises a pair of sprocket members 29 and 30 suitably secured to a rotary output member 31 of a final drive of the tractor. The teeth of sprocket members 29 and 30 engage pin and bushing assemblies 21 and 26, respectively, of first and second link assemblies 17 and 18. Although a single sprocket member 29 or 30 could be employed, a dual sprocket arrangement is preferred since it substantially increases the drive bearing contact with track assembly 11 to thus reduce the wear on drive sprocket 12 and on pin and bushing assemblies 21 and 26.

Figure 4:
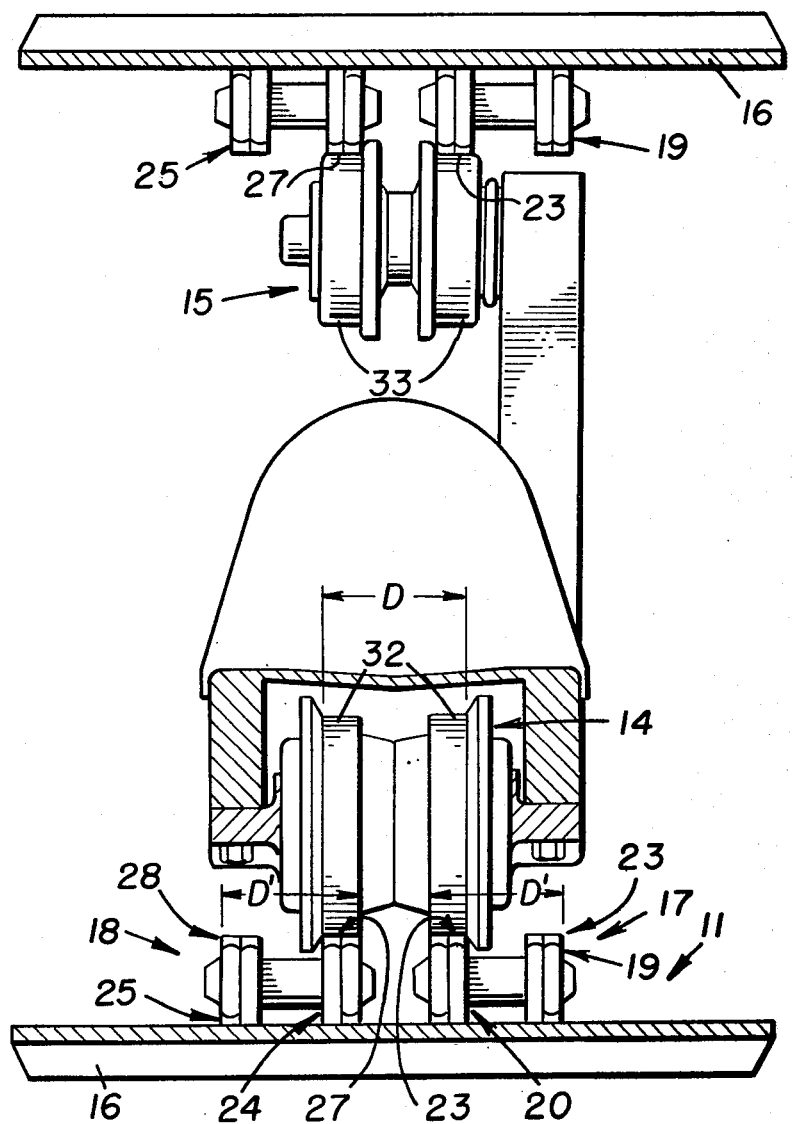

Referring to FIG. 4, each standard track roller 14 comprises a pair of annular bearing surfaces 32 which engage rail surfaces 22 and 27 of inboard links 20 and 24, respectively, in load bearing contact therewith. It should be noted that rail surfaces 22 and 27 are laterally spaced at a distance D, which is at least substantially equal to distances D' which define the lateral spacings of rail surfaces 22 and 27 from rail surfaces 23 and 28, respectively.

Thus, track assembly 11 may be substituted in lieu of a standard track assembly employing a single link assembly 17 or 18 thereon (but disposed intermediate the widths of track shoes 16) without having to modify the track roller frame or undercarriage of the vehicle, including the disposition and construction of track rollers 14. Likewise, standard upper guide rollers 15, having annular bearing surfaces 33 defined thereon, may be utilized with track assembly 11 of this invention. It should be further noted that upon wear of rail surfaces 22 and 27 of inboard links 20 and 24, respectively, that link assemblies 17 and 18 may be interchanged in a manner described hereinafter whereby unworn rail surfaces 23 and 28 may be substituted in the stead of worn rail surfaces 27 and 22, respectively.

Figure 5:
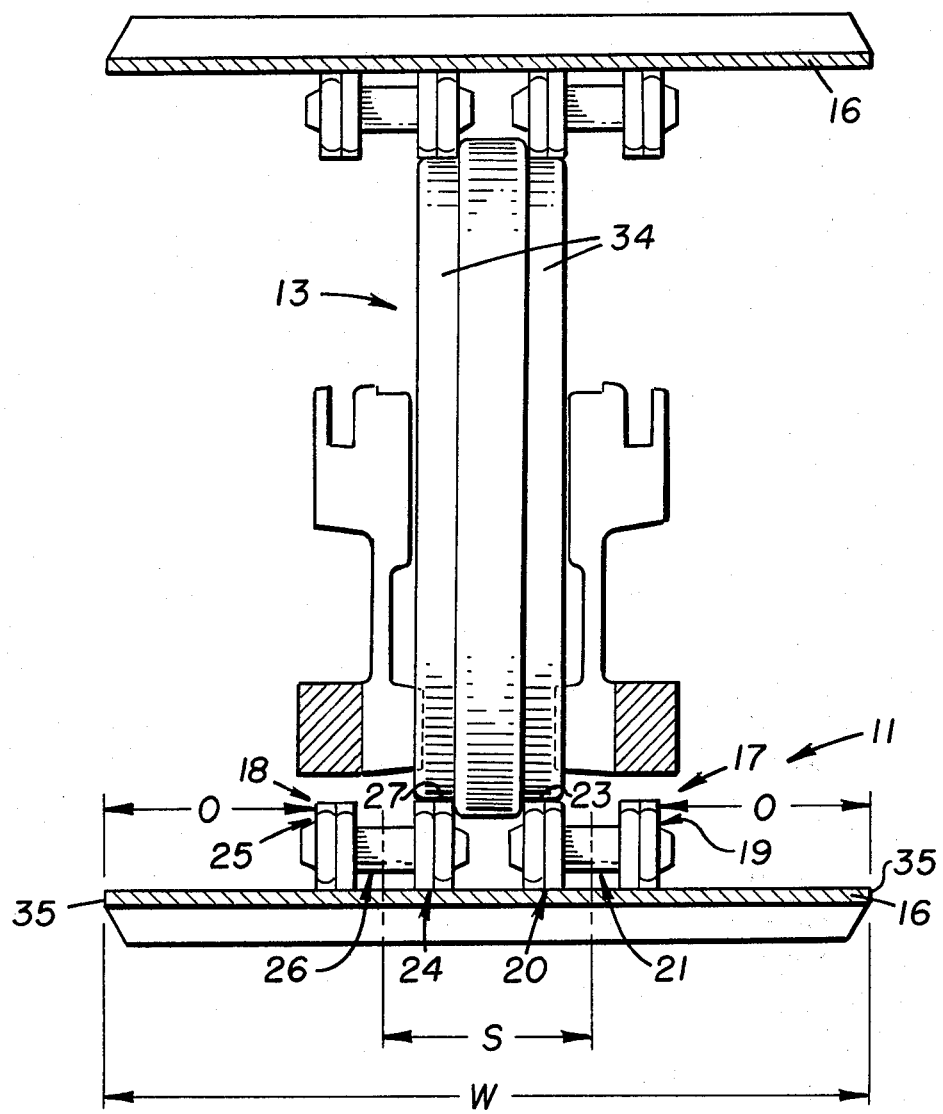

Referring to FIG. 5, a pair of annular bearing surfaces 34, defined on idler 13, also engage with rail surfaces 22 and 27 of links 20 and 24, respectively. Idler 13 is also a standard component of a conventional tractor and need not be changed when a standard track assembly is replaced by track assembly 11 of this invention. Thus, no modification of the track roller frame and associated undercarriage constructions of the tractor are required.

It should be further noted in FIG. 5 that a width W of each track shoe 16 is substantially larger than an overhang or unsupported length O of the track shoe, defined as the distance between each outer end 35 of the track shoe and a respective outboard link 19 or 25. Width W of track shoe 16 is preferably selected from the approximate range of from 2.0 to 5.0 times overhang O and, still more preferably, approximates 3.5 times the overhang. Also, overhang O is preferably approximately equal to or greater than a mean spacing S between link assemblies 17 and 18. Thus, track assembly 11 may exhibit a substantial overhang O since the pair of link assemblies 17 and 18 will resist torsional loads imposed on track assembly 11, due to reaction forces applied to the ends of track shoe 16 by their engagement with an immovable object, such as a rock, for example.

As suggested above, such torsional loading will tend to deflect and twist track shoe 16, both in its length and width directions, to subject the track shoes and link assemblies 17 and 18 to potential damage. However, the employment of dual link assemblies 17 and 18 will substantially rigidify the track assembly to resist torsional loads imposed thereon whereby potential damage to the track shoes and link assemblies will be avoided. Furthermore, since idler 13 and track rollers 14 are solely engageable with rail surfaces 22 and 27 of inboard links 20 and 24, torsional link loads are reduced over standard arrangements wherein a single link assembly is employed.

INDUSTRIAL APPLICABILITY

Track assembly 11 finds particular application to track-type vehicles which are adapted to work over swampy or marshy ground conditions of the type encountered during a logging operation. Although track assembly 11 finds particular application to tractor 10 (FIG. 1), it should be understood that it may be used on other types of track-type vehicles, such as excavators.

When tractor 10 traverses uneven terrain track shoes 16 thereof may engage an immovable object to create a reaction force tending to apply torsional loads to track assembly 11. The construction and arrangement of link assemblies 17 and 18 will substantially resist and prevent any damage to the track assembly in the manner described above. The employment of dual link assemblies 17 and 18 with track assembly 11 will function to permit track shoes 16 to share and absorb reaction loads imposed on any one or more track shoes. In addition to preventing any potential damage to link assemblies 17 and 18, such as a wallowing-out of the bushing bores and pin drift, the desired spacing (e.g., approximately 0.20 in.) will be maintained between the track shoes in their lengthwise direction to prevent any metal-to-metal contact and binding therebetween.

It should be again noted that only rail surfaces 22 and 27 of inboard links 20 and 24 engage with single track rollers 14 (FIG. 14) and a single idler 13 (FIG. 5) to thus adapt track assembly to the track roller frame and undercarriage of a standard tractor. Thus, track assembly 11 may avail itself of many of the well-tested and proven operational characteristics of a standard tractor, while yet adding the above-discussed anti-torsion desiderata thereto.

Should it be desired to prolong the service life of track assembly 11, and in particular link assemblies 17 and 18, the link assemblies may be interchanged in the following manner. A standard master pin or link (not shown) of track assembly 11 may be disconnected in a conventional manner to ready the disconnected track assembly for repair. Link assemblies 17 and 18 may then be disconnected from track shoes 16 and reversed laterally from their positions shown in FIG. 4. In particular, first link assembly 17 will be replaced by second link assembly 18 to thus position unworn rail surface 28 in contact with roller 14 and second link assembly will be replaced by first link assembly 17 to also place unworn rail surface 23 in contact with the roller.

It should be further understood that entire track assembly 11 may replace a standard track assembly, employing a single link assembly disposed intermediate the width of the track shoes, should the need arise, or vice versa. Such replacement will not require any modification of the track roller frame, including idler 13 and track rollers 14 which are useable with both types of track assemblies. However, the standard sprocket of the vehicle will require replacement by sprocket 12 since the teeth of the sprocket must be offset laterally to accommodate the now offset relationship of pin and bushing assemblies 21 and 26 (FIG. 3). Referring to FIGS. 4 and 5, upon such replacement, idler 13 and track rollers 14 will now engage the rail surfaces of inboard links 20 and 24 which are spaced laterally by a distance D, substantially identical to distance D' which depicts the link spacing of a standard link assembly.

Other aspects, objects and advantages of this invention can be obtained from a study of the drawings, the disclosure and the appended claims.

We claim:

1. In a track-type vehicle (10) of the type comprising a drive sprocket (12), an idler (13), a plurality of longitudinally spaced track rollers (14), and an endless track assembly (11), including a plurality of track shoes (16) and a pair of first (17) and second (18) laterally spaced link assemblies, each having laterally spaced sets of inboard (20,24) and outboard (19,25) links secured to said track shoes (16) with at least each set of said inboard links (20,24) defining a generally continuous rail surface (22,27) thereon, and pivot means (21,26) for pivotally connecting each pair of laterally spaced inboard (20,24) and outboard (19,25) links together, the improvement comprising Each of said idler (13) and said track rollers (14) being solely engageable in load bearing contact with the rail surfaces (22,27) defined on each set of the inboard links (20,24) of said first (17) and second (18) link assemblies.

2. The track-type vehicle of claim 1 wherein a generally continuous rail surface (23,28) is defined on each set of said outboard links (19,25) and wherein the rail surfaces (22,27) defined on each set of said inboard links (20,24) are laterally spaced at a distance (D) which is at least substantially equal to a distance (D') laterally spacing the rail surface (22,27) defined on each set of said inboard links (20,24) from the rail surface (23,28) defined on next adjacent set of outboard links (19,25).

3. The track-type vehicle of claim 1 wherein said drive sprocket (12) includes a pair of sprocket members (29,30) each engaged in driving relationship with the pivot means (21,26) of a respective one of said first (17) and second (18) link assemblies.

4. The track-type vehicle of claim 1 wherein a width (W) of each track shoe (16) is selected from the approximate range of from 2.0 to 5.0 times an overhang (O) of each of said track shoes, said overhang (O) defined as the distance between each outer end (35) of each track shoe (16) and a respective one of said outboard links (19,25).

5. The track-type vehicle of claim 4 wherein the width (W) of said track shoe (16) is approximately equal to 3.5 times said overhang (O).

6. The track-type vehicle of claim 1 wherein an overhang (O) of each of said track shoes (16), said overhang (O) being defined as the distance between each outer end (35) of each track shoe and a respective one of said outboard links (19,25), is at least equal to the mean lateral spacing (S) between said first (17) and second (18) link assemblies.

7. A method for prolonging the service life of a track assembly (11) including a plurality of track shoes (16) and a pair of first (17) and a pair of second (18) laterally spaced link assemblies, each including a plurality of pairs of inboard (20,24) and outboard (19,25) links releasably attached to said track shoes (16) with each of said links (19,20,24,25) defining a rail surface portion (22',22',27',28') thereon, said method comprising the steps of replacing said first link assembly (17) with said second link assembly (18), and replacing said second link assembly (18) with said first link assembly (17) to place the outboard links (19,25) of said first (17) and second (18) link assemblies in the stead of the inboard links (29,24) thereof.

8. The method of claim 7 wherein said replacing steps include the steps of engaging unworn rail surfaces (22,28) of the outboard links (19,25) of said first (17) and second (18) link assemblies with an idler (13) and track rollers (14) of a track-type vehicle (10).

9. The method of claim 8 wherein said vehicle (10) further comprises a drive sprocket (12) and said track assembly (11) further includes a plurality of pin and bushing assemblies (21,26) pivotally interconnecting the links (19,20,24,25) of said first (17) and second (18) link assemblies together, and further including the step of engaging the pin and bushing assemblies (21,26) of each of said first (17) and second (18) link assemblies with said drive sprocket (12).

10. A method for replacing a standard track assembly of a conventional track-type vehicle (10), having a plurality of track shoes (16) pivotally interconnected by a single link assembly engageable with an idler (13) and track rollers (14) of said vehicle (10), with another track assembly (11) having a plurality of track shoes (16) pivotally interconnected by a pair of laterally spaced link assemblies (17,18) each including laterally spaced pairs of inboard (20,24) and outboard (19,25) links comprising the steps of removing said standard track assembly from said vehicle (10), and mounting said another track assembly (11) on said vehicle (10) to engage only the inboard links (20,24) of said pair of link assemblies (17,18) with said idler (13) and said track rollers (14).

11. The method of claim 10 further comprising the steps of replacing a standard drive sprocket of said vehicle (10) with another drive sprocket (12) and engaging said another track assembly (11) with said another drive sprocket (12) in driving relationship therewith.

12. The method of claim 11 wherein said engaging step includes engaging each of said pair of link assemblies (17,18) with said another drive sprocket (12).

13. In a continuous track system having an endless track assembly (11) and a plurality of track rollers (14), said endless track assembly (11) including a plurality of track shoes (16) and a first link assembly (17) having a plurality of pairs of inboard and outboard links (20,19) and rail surfaces (22,23), said links (20,19) being connected to said track shoes (16), said rail surfaces (22,23) defining a lateral distance (D'), said track rollers (14) each having a bearing surface (32) positionable in forcible contact with said rail surfaces (22,23) substantially across said lateral distance (D') defined by said rail surface (22,23), the improvement comprising a second link assembly (18) having a plurality of pairs of inboard and outboard links (24,25) and rail surfaces (27,28) and being spaced from said first link assembly (17), said last-mentioned links (24,25) being connected to said track shoes (16), and said bearing surfaces (32) of the track rollers (14) each being positionable in forcible contact with the rail surfaces (22,27) of the first and second link assemblies (17,18) across a distance (D), said distance (D) being substantially the same as said lateral distance (D').

* * * * *